(12) United States Patent
Tsujii et al.

(10) Patent No.: US 7,079,189 B2
(45) Date of Patent: Jul. 18, 2006

(54) IMAGE SENSING APPARATUS

(75) Inventors: Osamu Tsujii, Tochigi (JP); Toshikazu Tamura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/923,422

(22) Filed: Aug. 8, 2001

(65) Prior Publication Data

US 2002/0044211 A1    Apr. 18, 2002

(30) Foreign Application Priority Data

Aug. 11, 2000  (JP)  .......................... 2000-245192
Aug. 2, 2001   (JP)  .......................... 2001-235052

(51) Int. Cl.
    *H04N 5/225*   (2006.01)

(52) U.S. Cl. .................. 348/372; 348/312; 250/208.4; 250/370.09; 378/112

(58) Field of Classification Search ................ 348/244, 348/250, 318, 230.1, 297, 312, 372; 250/208.4, 250/339.06, 348, 349, 354.1, 370.07, 370.08, 250/370.09, 393; 378/96, 97, 98, 101, 108, 378/109, 110, 111, 112

See application file for complete search history.

(56) References Cited

U.S. PATENT DOCUMENTS

| | | | |
|---|---|---|---|
| 4,258,264 A | 3/1981 | Kotera et al. | 250/484 |
| 4,675,747 A * | 6/1987 | Hanma et al. | 386/117 |
| 5,060,069 A * | 10/1991 | Aoki | 348/229.1 |
| 5,773,832 A * | 6/1998 | Sayed et al. | 250/370.09 |
| 5,777,508 A * | 7/1998 | Sawanobori | 327/534 |
| 6,035,013 A | 3/2000 | Orava et al. | 378/37 |
| 6,448,561 B1 * | 9/2002 | Kaifu | 250/370.09 |
| 6,539,076 B1 * | 3/2003 | Shoji | 378/98.8 |
| 6,567,125 B1 * | 5/2003 | Shimizu | 348/297 |
| 6,984,815 B1 * | 1/2006 | Yumii et al. | 250/370.09 |
| 7,012,260 B1 * | 3/2006 | Endo | 250/370.11 |
| 2005/0062865 A1 * | 3/2005 | Shibazaki | 348/300 |
| 2006/0071171 * | 4/2006 | Kameshima | 250/370.09 |

FOREIGN PATENT DOCUMENTS

| | | |
|---|---|---|
| JP | 55-012429 | 1/1980 |
| JP | 56-011395 | 2/1981 |
| JP | 10-104766 | 4/1998 |
| JP | 10104766 A * | 4/1998 |
| JP | 11151233 A * | 6/1999 |
| JP | 11-331703 | 11/1999 |

* cited by examiner

*Primary Examiner*—Tuan Ho
*Assistant Examiner*—John M. Villecco
(74) *Attorney, Agent, or Firm*—Fitzpatrick, Cella, Harper & Scinto

(57) ABSTRACT

For providing a longer lifetime and sensing an image with less noise, there is provided an image sensing apparatus having a flat panel sensor for detecting radiations, a first power circuit for supplying an electric power to the flat panel sensor, a read-out circuit for reading out data of the flat panel sensor circuit, a second power circuit for supplying an electric power to the read-out circuit, and a control circuit for turning the first power circuit on by a first timing signal and for turning the second power circuit on by a second timing signal.

12 Claims, 7 Drawing Sheets

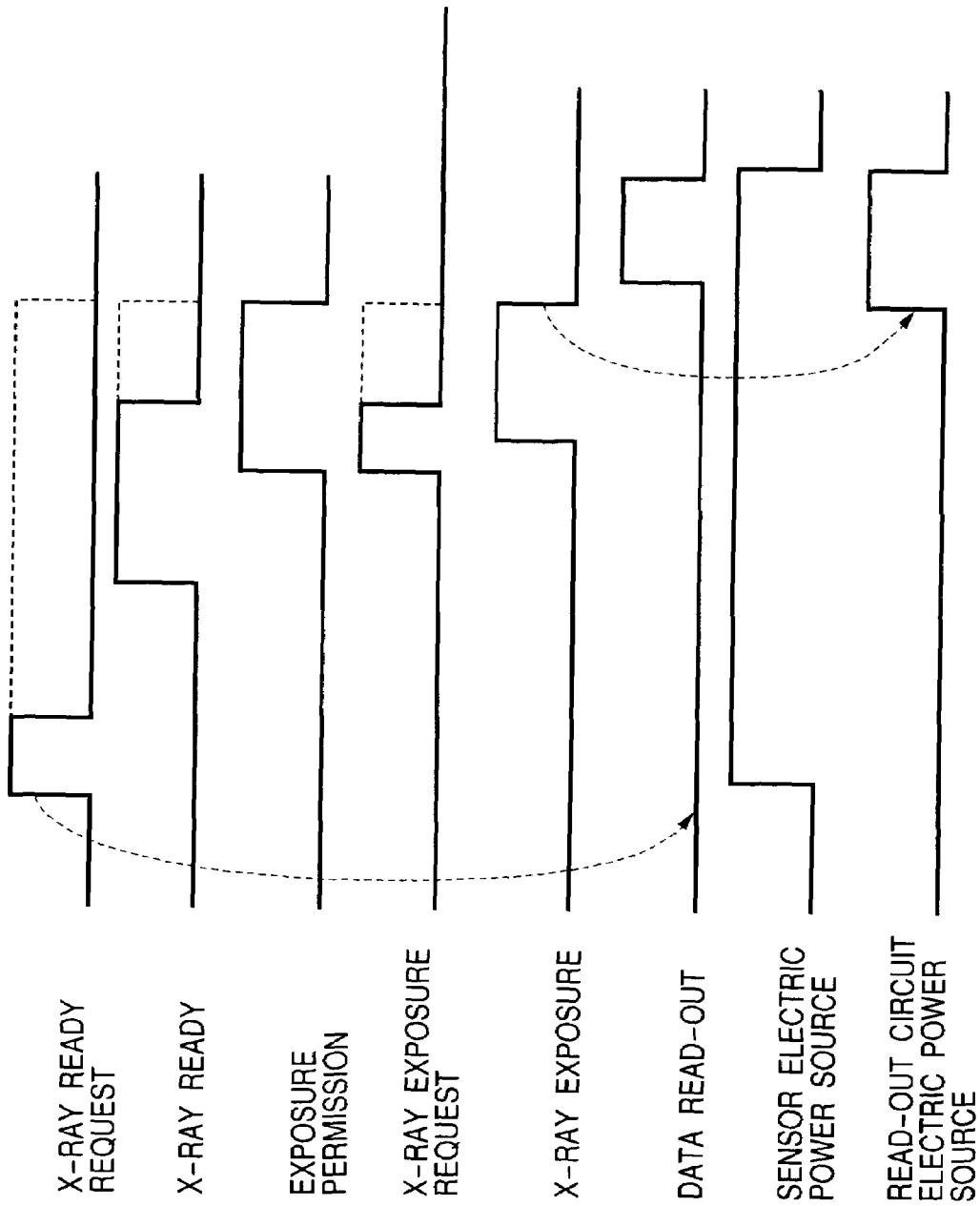

IMAGE SENSING APPARATUS

BACKGROUND OF THE INVENTION

1. Field of the Invention

The present invention relates to image sensing apparatus for sensing an image of an object and a method of controlling the image sensing apparatus.

2. Related Background Art

It is known that, when fluorescent substances of certain kinds are exposed to radiations (X-rays, $\alpha$-rays, $\beta$-rays, $\gamma$-rays, electron beams, ultraviolet rays, etc.), part of the radiation energy is accumulated in the fluorescent substances and that, when such fluorescent substances are then exposed to scintillation light such as visible light or the like, the fluorescent substances exhibit stimulated emission according to the accumulated energy. The fluorescent substances possessing this property are called storage type phosphors (photostimulable phosphors).

There are proposals of radiographic information recording/reproducing systems making use of such storage type phosphors and configured to record radiographic image information of an object such as a human body or the like once in a sheet of an storage type phosphor, scan this storage type fluorescent sheet with scintillation light such as laser light or the like to cause stimulated emission, then photoelectrically read the resultant stimulated emission to obtain image signals, and present a radiographic image of the object as a visible image on a recording material such as a photosensitive film or the like, or on a display device such as a CRT or the like, based on the image signals (e.g., in Japanese Laid-Open Patent Applications No. 55-12429, No. 56-11395, etc.).

There are also systems developed recently to sense an X-ray image similarly by use of semiconductor sensors. These systems have the practical advantage of capability of recording the image covering an extremely wide radiation exposure range, as compared with the conventional radiographic systems using silver halide films. Namely, such systems are configured to read X-rays in a very wide dynamic range by photoelectric conversion means, convert them into electric signals, and output the radiographic image as a visible image on the recording material such as the photosensitive film or the like or on the display device such as the CRT or the like, using such the electric signals, whereby the systems can provide the radiographic image without being affected by variation in exposure dose of radiations.

Operation cycles of the conventional X-ray sensing apparatus are normally one-day periodicity. For example, upon an operation test of an X-ray generator, the power is also turned on for such devices as an X-ray film changer, an X-ray solid-state imaging device, and so on, thereafter the power is kept on during hours when objects, e.g., patients can appear, and the power is turned off after an end of the last image sensing in that day.

It is very rare for the image sensing apparatus to sense X-rays incessantly during the hours. It is thus common practice to control the sensing apparatus to low power consumption during non-sensing periods or to bring the system into a standby mode in which the imaging device is liberated from an imaging state so as to reduce the load on the imaging device. For implementing it, for example, an operator provides a command to transfer the system into the standby mode, or the sensing apparatus automatically moves into the standby mode if there is no access to the sensing apparatus for a predetermined period.

When an object, e.g., a patient appears, the apparatus normally shifts from the standby mode into the normal imaging mode in response to a command inputted by the operator.

Japanese Laid-Open Patent Application No. 10-104766 discloses the prior art in which a patient detecting sensor is provided in proximity to the X-ray image sensor, the X-ray image sensor is kept in the sensing state (on) only during a period when a patient is present in front of the sensor, and the sensor is turned into the standby state (off) during periods when no patient is present.

Since the conventional apparatus makes transitions between the sensing mode and the standby mode according to instructions from the operator, as described above, the apparatus can be maintained in a state of preparation for sensing in spite of absence of a human body (object) because of an operation error of the operator, a long setting of the predetermined period, or the like. This can sometimes result in decreasing the lifetime of the X-ray sensing device. Sensors comprised of semiconductors can suffer problems of occurrence of a wait time during the preparation for sensing or before sensing, and decrease in the total product life. Energization of the sensing part for a long period will result in generating excess heat in the sensor housing and the heat can bring about a demerit of increasing offsets of the sensor or a read-out circuit.

SUMMARY OF THE INVENTION

An object of the present invention is to provide an image sensing apparatus with a long lifetime and a method of controlling the image sensing apparatus.

Another object of the present invention is to provide an image sensing apparatus that can sense an image with reduced noise and a method of controlling the image sensing apparatus.

In order to accomplish the above objects, according to one aspect of the present invention, there is provided an image sensing apparatus comprising:

a sensor region including a plurality of pixels for detecting an image of an object;

a read-out circuit adapted to sequentially read out signals from the plurality of pixels into a common output portion; and a power supply unit adapted to supply electric powers to the sensor region and to the read-out circuit independently.

According to another aspect of the present invention, there is provided a method of controlling an image sensing apparatus comprising a sensor region including a plurality of photoelectric conversion elements for detecting an image of an object and a read-out circuit adapted to sequentially read out signals from the plurality of photoelectric conversion elements into a common output portion, the method comprising:

a step of supplying electric powers to the sensor region and to the read-out circuit independently.

The other objects and features of the present invention will become apparent from the description of the specification and drawings which will follow.

BRIEF DESCRIPTION OF THE DRAWINGS

FIG. 7 is a diagram showing a third power on timing example.

DESCRIPTION OF THE PREFERRED EMBODIMENTS

Figure 1:
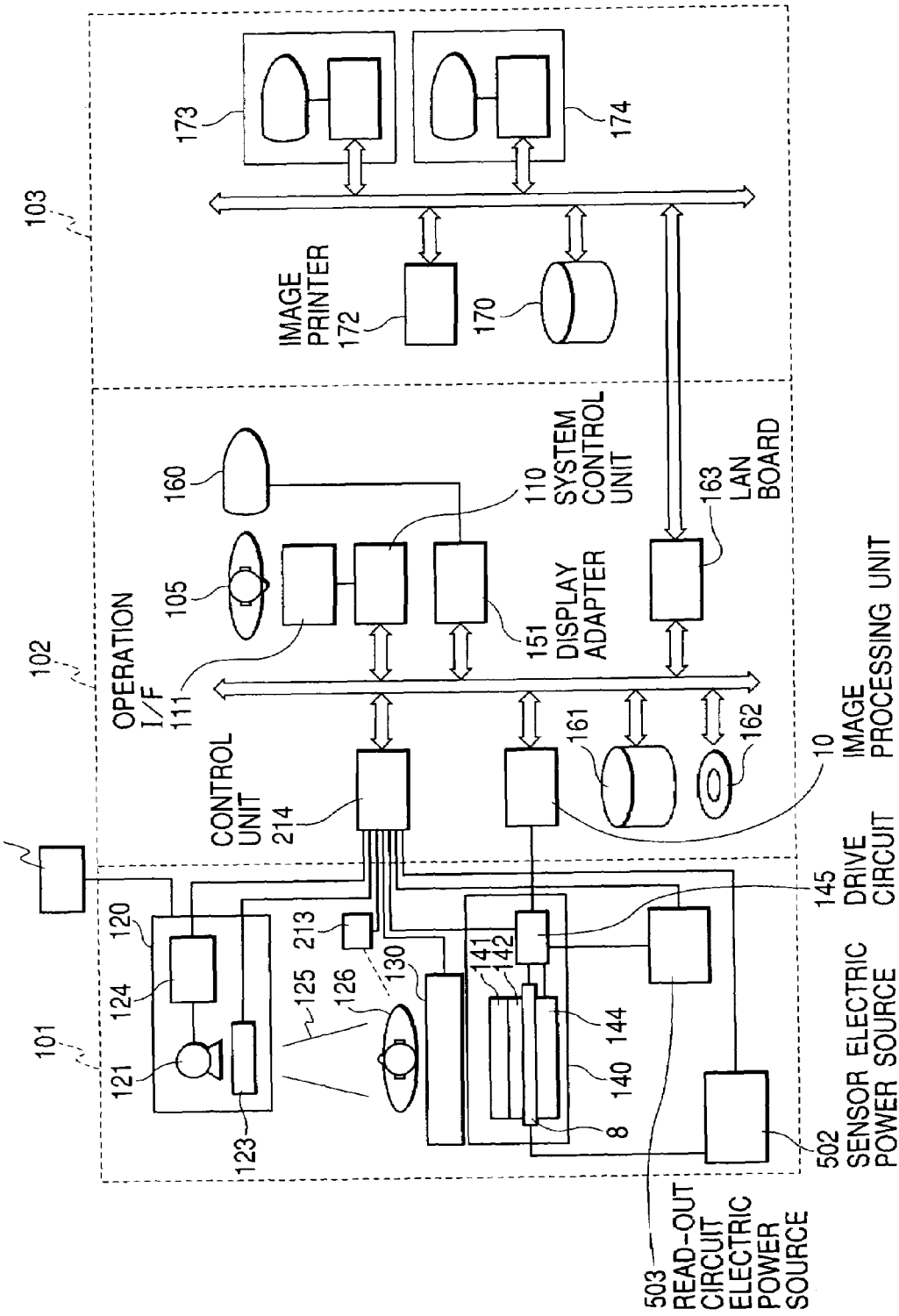
FIG. 1 is a diagram showing a detailed configuration of an X-ray image sensing apparatus.

The embodiments of the present invention will be described below with reference to the drawings.

In order to lengthen a lifetime of a flat panel sensor (sensor) comprised of semiconductors, the image sensing apparatus according to an embodiment of the present invention is configured to supply the electric power to the flat panel sensor and the electric power to the read-out circuit including amplifiers for amplifying electric signals from the sensor, a multiplexer for sequentially reading out signals from the amplifiers, etc. independently of each other, whereby the apparatus is provided with some standby period of the sensor before sensing and whereby heat generation can be suppressed in the sensing part.

Describing the above in more detail, the flat panel sensor has the feature of small power consumption and thus poses no problem in terms of heat generation, but, when image sensing is started immediately after turning-on of power, the sensor shows high offset amounts of respective channels and fails to obtain a stable image. In order to solve it, it can be contemplated that the power to the sensor is turned on at the timing of the detection of a signal from a patient detecting sensor or order information from a radiation information system and the power to the sensor is turned off at the timing of the detection of absence of a patient or at the time of completion of sequential image sensing. In the strict sense, however, in view of the fact that the lifetime of the sensor is decreased by supplying power to the sensor, it is desirable to turn the power to the sensor on not during the period when the patient is present in front of the sensor but the period of sensing.

However, offsets are relatively large if the power to the sensor is turned on immediately before X-ray exposure. This can be solved in such a way that the operator provides a request for actuation of an X-ray generator to the X-ray generator and the sensor is switched on according to a ready request signal (a signal for actuating devices in the X-ray generator in order to bring the X-ray generator into a state ready for X-ray exposure) outputted in response to the request. In general the ready request signal initiates rotation of a rotor (rotary anode) of an X-ray tube and a ready signal is generated from the X-ray generator at the time when the rotor becomes rotating at a constant speed and a filament and high voltage become ready (completion of preparation) (i.e., when it becomes possible to accept a request for X-ray exposure from the operator or the like). The time from the output of the ready request signal to the output of the ready signal is generally about one second and the period of about one second is long enough to lower the offset level of the sensor to a satisfactorily small level.

However, the time from the ready request signal to the ready signal, which is dependent on the X-ray generator, can be conceivably insufficient for the stability of offsets, depending upon characteristics of the sensor. In this case, an exposure permission signal to the X-ray generator can be generated after a lapse of a predetermined period since turning-on of power to the sensor in response to the ready request signal. As another means, it is also possible to check offset amounts of the sensor panel in real time by use of the read-out circuit and generate the exposure permission signal while monitoring the offset amounts, though control is very complex. In this case, it is necessary to turn on an electric power of the read-out circuit on the occasion of reading the offsets.

On the other hand, since the read-out circuit for reading out data from the sensor comprises amplifier circuit which is power-consuming, it generates heat during long-term operation and the heat can adversely affect the sensor or the read-out circuit. Since the read-out circuit can operate stably even immediately after turning-on of power, it is appropriate to use either of two power-on timings. One is an exposure request signal (a signal generated in response to an X-ray exposure request from the operator or the like), and the other an X-ray exposure completion signal. The exposure completion signal can be generated based on an off signal of high voltage of the X-ray generator, or a sensor for monitoring X-rays may be provided on the image sensing apparatus side to be used for the generation of the exposure completion signal.

Referring to FIG. 1, the entire X-ray image sensing system (image sensing apparatus) of the present embodiment will be described. Numeral 101 designates an X-ray room, 102 an X-ray control room, and 103 a diagnostic room. The overall operation of the present X-ray image sensing system is controlled by a system control unit 110. The functions of the system control unit 110 are mainly those described below.

The system control unit 110 first receives an instruction from the operator through an operator interface 111. The image acquisition is implemented using an X-ray control console 501 in addition to the operator interface 111.

The operator interface 111 can be either of a touch panel on a display, a mouse, a keyboard, a joy stick, a foot switch, and so on. Using the operator interface 111 the operator can set imaging sensing conditions (still picture, motion picture, X-ray tube voltage, tube current, X-ray exposure time, etc.), image sensing timing, image processing conditions, subject ID, a method of processing a captured image, and so on, but the operator does not have to input them one by one, because almost all information is transferred from a radiation information system. An operator's important task is a work of confirming a sensed image. Namely, the operator makes judgments about whether the angle is correct, whether the patient is freezed, whether the image processing is appropriate, and so on.

Then the system control unit 110 provides an instruction of image sensing conditions based on the instruction from the operator 105, to a sensing control unit 214 in charge of the X-ray sensing sequence and then captures data. Based on the instruction, the sensing control unit 214 actuates an X-ray generator 120 as a radiation source, an image sensing bed 130, and an X-ray detector 140 to capture image data, then transfer the data to an image processing unit 10, carry out the image processing designated by the operator, display an image on a display 160, and, at the same time, store basic image processing data in an external memory 161.

Further, based on an instruction from the operator 105, the system control unit 110 performs image reprocessing and regeneration, transfer and storage of image data to a device on a network, displaying on the display unit, printing on film, and so on.

The system will be described below in order according to the flow of signals.

The X-ray generator 120 includes an X-ray tube 121 and an X-ray cone control 123. The X-ray tube 121 is driven by a high-voltage generating power source 124 under control of the sensing control unit 214 to emit an X-ray beam 125. The X-ray cone control 123 is driven by the sensing control unit 214 to shape the X-ray beam 125 in conjunction with the charge of an image sensing area so as to avoid unnecessary X-ray irradiation. The X-ray beam 125 is directed toward a subject 126 lying on the image sensing bed 130 which transmits X-rays. The image sensing bed 130 is driven based on an instruction from the sensing control unit 214. The X-ray beam 125 is transmitted by the subject 126 and the image sensing bed 130 to impinge on the X-ray detector 140 thereafter.

The X-ray detector 140 is comprised of a grid 141, a scintillator 142, a sensor 8, an X-ray exposure dose monitor (AEC) 144, and a driving circuit 145. Here the driving circuit includes the read-out circuit for reading signals from the sensor and a line selector for selecting pixels to be read out in the sensor. The grid 141 reduces influence of X-ray scattering caused by the transmission through the subject 126. The grid 141 consists of an X-ray low absorbing member and an X-ray high absorbing member and is, for example, of a stripe structure of Al and Pb. During X-ray irradiation the grid 141 is moved based on an instruction from the sensing control unit 214 in order to avoid occurrence of a moire pattern because of the frequency difference between the photosensor array 8 and the grid 141.

In the scintillator 142 a matrix substance of a fluorescent material is excited by X-rays having high energy to emit fluorescence in the visible region based on recombination energy upon recombination. The fluorescence is one originating in the matrix itself, such as $CaWO_4$ or $CdWO_4$, or one originating in a luminescence center substance activated in the matrix, such as CsI:Tl or ZnS:Ag.

The sensor 8 for detecting the object image is placed adjacent to this scintillator 142. This sensor 8 converts photons to electric signals. The X-ray exposure dose monitor 144 senses the amount of transmitted X-rays. The X-ray exposure dose monitor 144 may be one directly detecting X-rays by a crystalline silicon photodetector or the like, one of an ion chamber type placed in front of the sensor 8, or one detecting light from the scintillator 142.

In this example, the sensor detects visible light (proportional to the amount of X-rays) transmitted by the scintillator and sends the information to the sensing control unit 214, and the sensing control unit 214 drives the high-voltage generating power source 124, based on the information, to shut off or control X-rays. The driving circuit 145, including the read-out circuit for reading the data from the sensor 8, and others, drives the flat panel sensor 8 under control of the sensing control unit 214 to read out signals from the respective pixels. The sensor 8 and driving circuit 145 will be detailed later.

The image signals from the X-ray detection unit 140 are transferred from the X-ray room 101 to the image processing unit 10 in the X-ray control room 102. Since noise due to generation of X-rays is high in the X-ray room 101, the image data cannot be transferred accurately because of the noise in certain cases. Therefore, the transfer line needs to be provided with high noise resistance. It is thus desirable to employ a transmission system provided with an error correction function and, in addition thereto, to use a transmission line constructed of a shielded, twisted pair cable or an optical fiber with a differential driver, for example. In the image processing unit 10, display data is switched based on an instruction from the sensing control unit 214 (which will be detailed later). In addition to these, it is also possible to implement correction for image data, spatial filtering, recursive processing, etc. in real time or to implement tone processing, correction for scattered radiation, DR compression processing, and so on.

The image thus processed is displayed through a display adapter 151 on a display unit 160. At the same time as the real-time image processing, the basic image, after subjected to only the correction for data, is saved in a fast memory 161. The fast memory 161 is desirably a data storage device satisfying large capacity, high speed, and high reliability and desirably, for example, a hard disk array or the like such as RAID or the like. Based on an operator's instruction, the image data saved in the fast memory 161 is stored in the external memory. On that occasion, the image data is reconstructed so as to satisfy predetermined standards (for example, IS&C) and the thus reconstructed data is stored in the external memory. The external memory is, for example, a magnetooptical disk 162, a hard disk in a file server 170 on a LAN, and so on.

This X-ray image sensing system can be connected through a LAN board 163 to the LAN and has a configuration data-compatible with HIS. Connected to the LAN are a plurality of X-ray image sensing systems, of course. In addition, connected to the LAN are a monitor 174 for displaying moving and still pictures of the image, the file server 170 for filing the image data, an image printer 172 for outputting the image on a film, an image processing terminal 173 for performing complicated image processing and diagnostic support, and so on. The instant X-ray image sensing system outputs the image data according to a predetermined protocol (e.g., DICOM). In addition, it is also possible for a doctor at a remote place to provide a real-time remote diagnosis upon X-ray sensing, using a monitor connected to the LAN.

Figure 2:
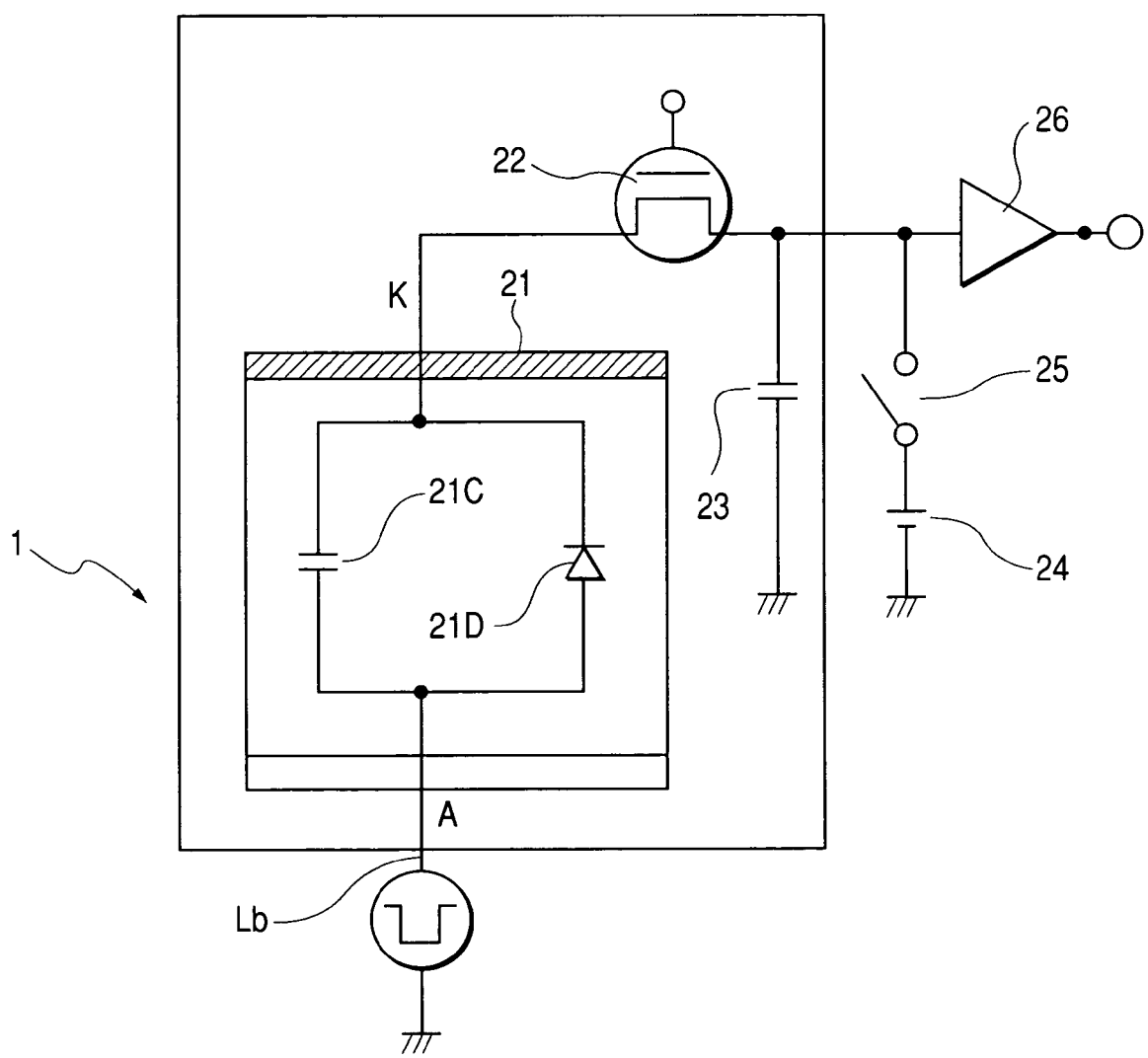
FIG. 2 is an equivalent circuit diagram of a sensor.

FIG. 2 shows an equivalent circuit of part of the sensor 8. The example below will be described as to the two-dimensional sensor made of amorphous silicon, but the sensor does not have to be limited to the specific example; for example, it may be another device such as a solid-state image sensor (e.g., a charge coupled device) or a photomultiplier tube. In the case of such another device, the A/D conversion unit can be constructed with similar function and in similar structure.

Now description will be given referring back to FIG. 2. In the present embodiment one pixel 1 is comprised of a photoelectric conversion element 21 and a switching TFT (thin-film transistor) 22 for controlling storage and reading of charge, and is generally made of amorphous silicon ($\alpha$-Si) formed on a glass substrate. The photoelectric conversion element 21 may be constructed of simply a photodiode 21D having a parasitic capacitance, or a configuration including the photodiode 21D and an additional capacitor 21C to improve the dynamic range, which are connected in parallel.

The anode A of the diode 21D is connected to a bias wire Lb which is a common electrode, and the cathode K thereof is connected to the controllable switching TFT 22 for reading out the charge stored in the capacitor 21C. In this example, the switching TFT 22 is a thin-film transistor connected between the cathode K of the diode 21D and a charge reading amplifier 26.

A signal charge appears in such a manner that the capacitor 21C is first reset by operation of the switching TFT 22 and a reset switching device 25, thereafter radiations 1 are emitted, the photodiode 21D generates a charge according to a dose of radiations, and the charge is accumulated in the capacitor 21C. After that, the signal charge is again transferred to a capacitative element by operation of the switching TFT 22 and the reset switching device 25. Then the amount of the charge stored by the photodiode 21D is read out as a potential signal by the preamplifier 26 and the signal is subjected to A/D conversion to detect the dose of incident radiations.

Figure 3:
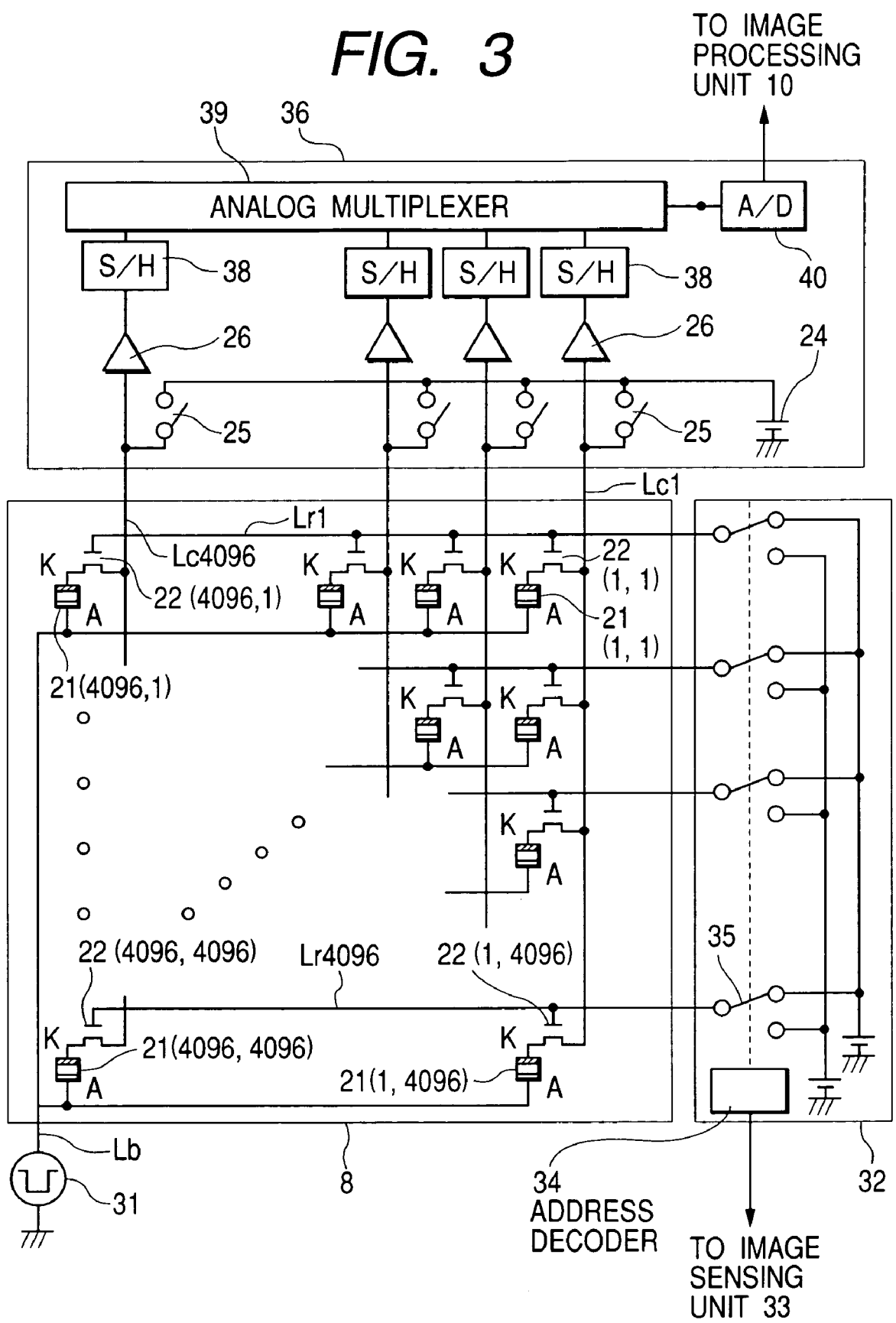
FIG. 3 is a circuit diagram of a flat sensor panel.

FIG. 3 is an equivalent circuit diagram showing a photoelectric conversion apparatus including the sensor 8 and the driving circuit 145 (the read-out circuit 36 and the line selector 32). The photoelectric conversion operation will be described below in a specific expanded configuration in which a plurality of photoelectric conversion elements of the structure shown in FIG. 2 are arrayed two-dimensionally.

The sensor 8 is composed of a pixel array of approximately 2000×2000–4000×4000 pixels and the array area is approximately 200 mm×200 mm –500 mm ×500 mm. In FIG. 3, the photodetector array 8 is composed of 4096×4096 pixels and the array area is 430 mm×430 mm. Therefore, the size of each pixel is approximately 105 μm×105 μm. 4096 pixels in one block are wired laterally and 4096 lines are arranged vertically in order, thereby two-dimensionally arranging the pixels. This sensor 8 is formed on a common amorphous silicon semiconductor substrate.

The above example was the example in which the sensor 8 of 4096×4096 pixels was constructed of one substrate, but it is also possible to construct the sensor 8 of 4096×4096 pixels of four sensors each having 2048×2048 pixels. When the single sensor 8 is constructed of four detectors of 2048×2048 pixels, this configuration presents the merit of improvement in yields because of fabrication of divided detectors.

As described previously, each pixel is comprised of a photoelectric conversion element 21 and a switching TFT 22. Each of 21 (1,1) to 21 (4096,4096) corresponds to the foregoing photoelectric conversion element 21, in which K represents the cathode side of the photodetection diode and A the anode side. Each of 22 (1,1) to 22 (4096,4096) corresponds to the switching TFT 22.

The K electrodes of the respective photoelectric conversion elements 21 (m, n) in each column of the sensor 8 are connected through the source and drain conductive paths of the corresponding switching TFTs 22 (m, n) to a common column signal line (Lc1 to Lc4096) corresponding to each column.

For example, the photoelectric conversion elements 21 (1,1) to 21 (1,4096) of column 1 are connected to a first column signal line Lc1. The A electrodes of the respective photoelectric conversion elements 21 in each row are connected through a common bias wire Lb to a bias power source 31 for control of the aforementioned mode. The gate electrodes of TFTs 22 in each row are connected to a row select line (Lr1 to Lr4096). For example, the TFTs 22 (1,1) to 22 (4096,1) in row 1 are connected to a row select line Lr 1.

The row select lines Lr are connected through the line selector unit 32 to the sensing control unit 33. The line selector unit 32 is comprised, for example, of an address decoder 34 and 4096 switching devices 35. This configuration enables an arbitrary line Lrn to be read out. The line selector unit 32, if constructed in the simplest form, can be constructed simply of a shift register which is used in liquid crystal displays or the like.

The column signal lines Lc are connected to the signal reading circuit 36 (included in the driving circuit of FIG. 1) controlled by the sensing control unit 33. Numeral 25 designates switches for resetting the column signal lines Lr to a reference potential of a reset reference power source 24, numeral 26 denote preamplifiers for amplifying signal potentials, 38 sample hold circuits, 39 an analog multiplexer, and 40 an A/D converter. Signals from the respective column signal lines Lrn are amplified by the associated preamplifiers 26 to be held by the sample hold circuits 38. The analog multiplexer 39 sequentially outputs the output signals to the A/D converter 40 to convert them to digital values and the digital signals are transferred to the image processing unit 10.

The photoelectric conversion apparatus of the present embodiment is configured to separate the 4096×4096 pixels into the 4096 lines Lcn, simultaneously transfer outputs of 4096 pixels per row, and sequentially output the signals through the column signal lines Lc and through the 4096 preamplifiers 26 and 4096 sample hold circuits 38 to the A/D converter 40 by the analog multiplexer 39.

In FIG. 3 the A/D converter 40 appears as if it were constructed of a single converter, but the A/D converter unit in practice is comprised of 4 to 32 systems of A/D converters 40 to execute A/D conversion simultaneously. Namely, signals from every plural columns are supplied to a common A/D converter. The reason is that the read-out time of image signals is required to be shortened without unnecessary increase of the analog signal band and A/D conversion rates. The A/D conversion unit will be detailed later.

The accumulation time and the A/D conversion time are in an intimate relation and fast A/D conversion will result in broadening the band of the analog circuit, which makes it difficult to achieve a desired S/N ratio. Therefore, the read-out time of image signals is required to be shortened without unnecessary increase of the A/D conversion speed. This can be implemented by executing the A/D conversion with many A/D converters 40, but cost becomes high in that case. Therefore, an appropriate number needs to be selected in consideration of the above-stated points.

Since the irradiation time of radiations 1 is approximately 10 to 500 msec, an appropriate capture time of the entire screen or charge accumulation time is of the order of 100 msec or a little shorter than it.

For example, in order to capture the image in 100 msec by sequentially driving all the pixels, the analog signal band is approximately 50 MHz and the A/D conversion is carried out, for example, at the sampling rate of 10 MHz, which requires at least four systems of A/D converters 40. In the present image sensing apparatus the A/D conversion is executed simultaneously by sixteen systems. Output signals from the sixteen systems of A/D converters 40 are supplied to sixteen systems of respectively corresponding memories not shown (FIFOs or the like). The memories are selectively switched to gain image data for one continuous scan line, and the image data is transferred to the subsequent image processing unit 10, or to a memory thereof. After this, the image data is displayed as an image or as a graph on a monitor such as a display unit.

ON/OFF cycles of power of the conventional X-ray image sensing apparatus are normally power cycles of one-day periodicity, but power ON/OFF timing of the image sensing apparatus of this embodiment is as follows.

Figure 4:
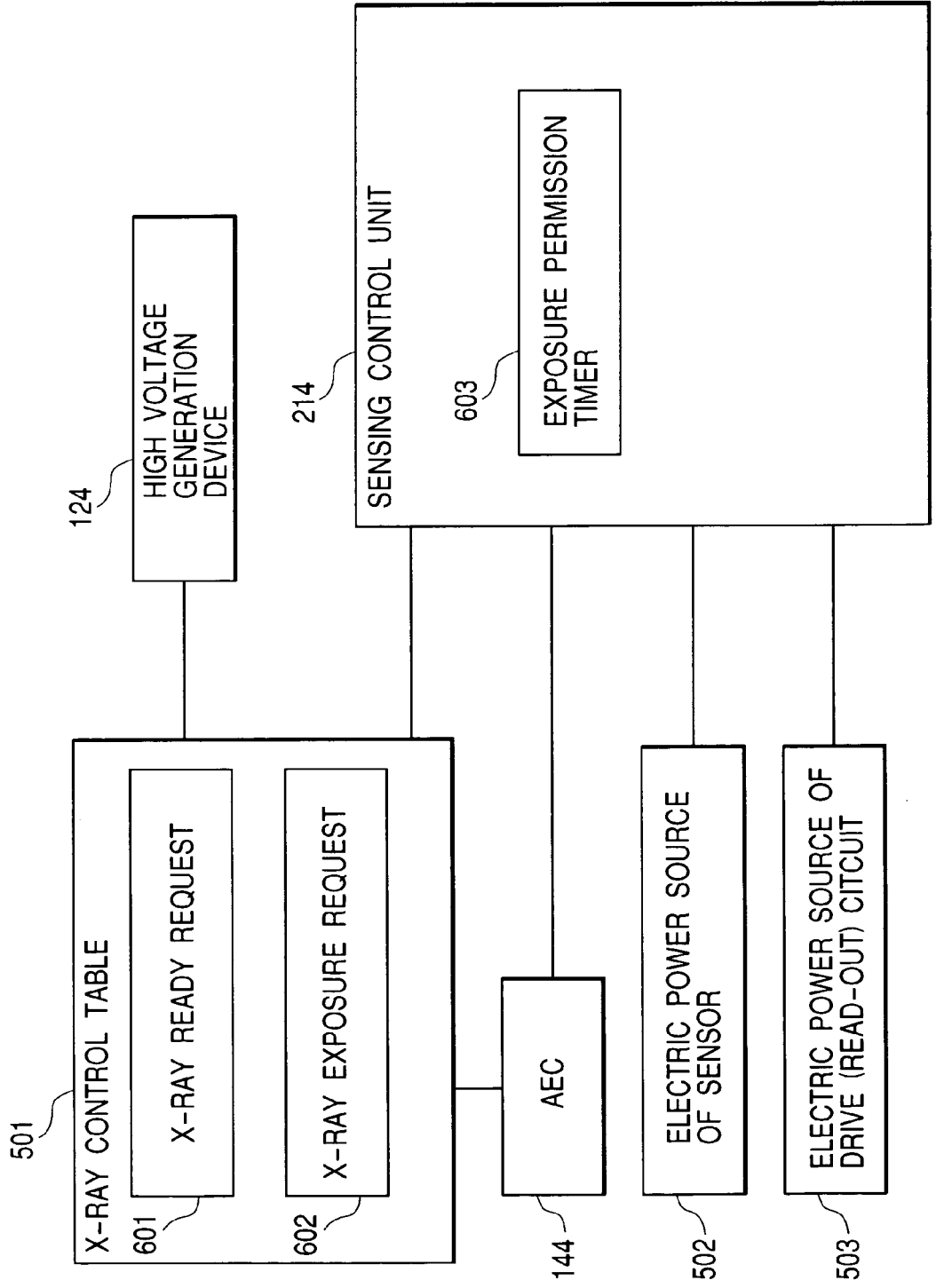
FIG. 4 is a diagram showing power on timing generating parts.

FIG. 4 shows constitutive portions necessary for turning-on of electric powers to the sensor 8 and to the read-out circuit 36. The X-ray control table 501 has at least two switches of X-ray ready request switch (SW) 601 for output of an X-ray ready request signal and an X-ray exposure request SW 602 for output of an X-ray exposure request signal, and is connected to the high voltage generation device 124, to the AEC 144, and to the sensing control unit 214. The sensing control unit 214 has an exposure permission timer 603 and is connected to the AEC 144, to the electric power source 502 of the sensor, and to the electric power source 503 of the read-out circuit.

When the operator pushes the X-ray ready request SW 601, the X-ray ready request signal is generated. In response to this signal the X-ray device initiates the preparation for exposure, e.g., rotation of the rotary anode of the tube. In general, the operator often also depresses the X-ray exposure request SW 602 at the same time as the depression of the X-ray ready request SW 601. In this case, when the rotary anode of the tube reaches constant rotation to become ready for X-ray exposure, and then after the device becomes ready for X-ray exposure, the X-ray exposure request signal is asserted and X-ray exposure starts.

Figure 5:
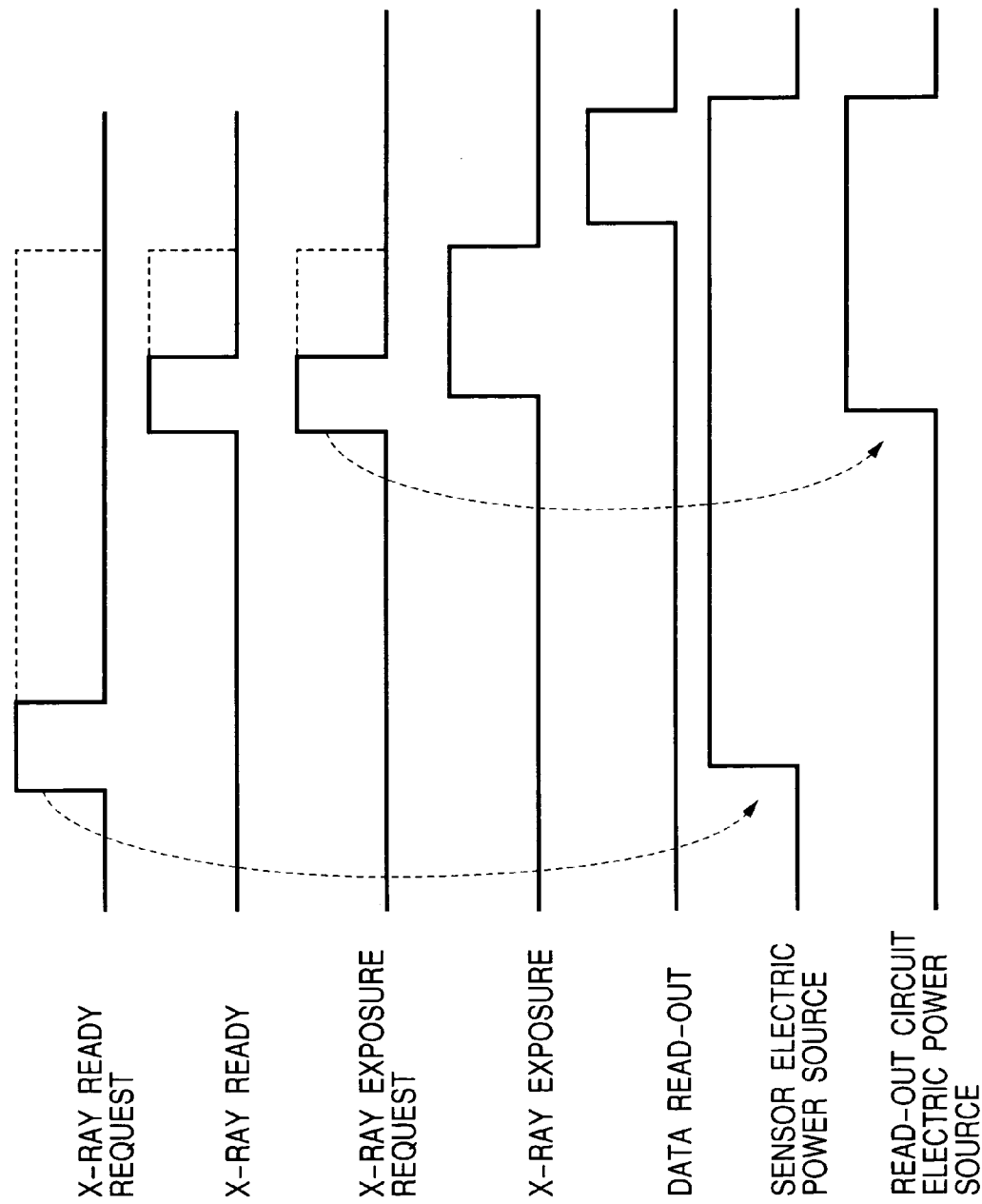
FIG. 5 is a diagram showing a first power on timing example.

First presented in FIG. 5 is a first timing example showing a relation among the exposure timing of the X-ray generator and the supply timings of powers to the sensor 8 and to the read-out circuit 36.

The sensor power source 502 is turned on with the timing of output of the X-ray ready request signal and the read-out circuit power source 503 is turned on with the timing of output of the exposure request signal. When the X-ray exposure device (AEC) 144 then detects X-rays amount enough for sensing, the AEC 144 shuts off the X-ray exposure. Then the control unit starts reading out data and then turns off the two power sources (the sensor power source 502 and the reading-out drive circuit power source 503) at the time of completion of read-out. The above operation is the first timing example which is controlled by the sensing control unit 214.

Next presented is a second timing example showing a relation among the exposure timing of the X-ray generator and the supply timings of powers to the sensor 8 and the read-out circuit 36.

Figure 6:
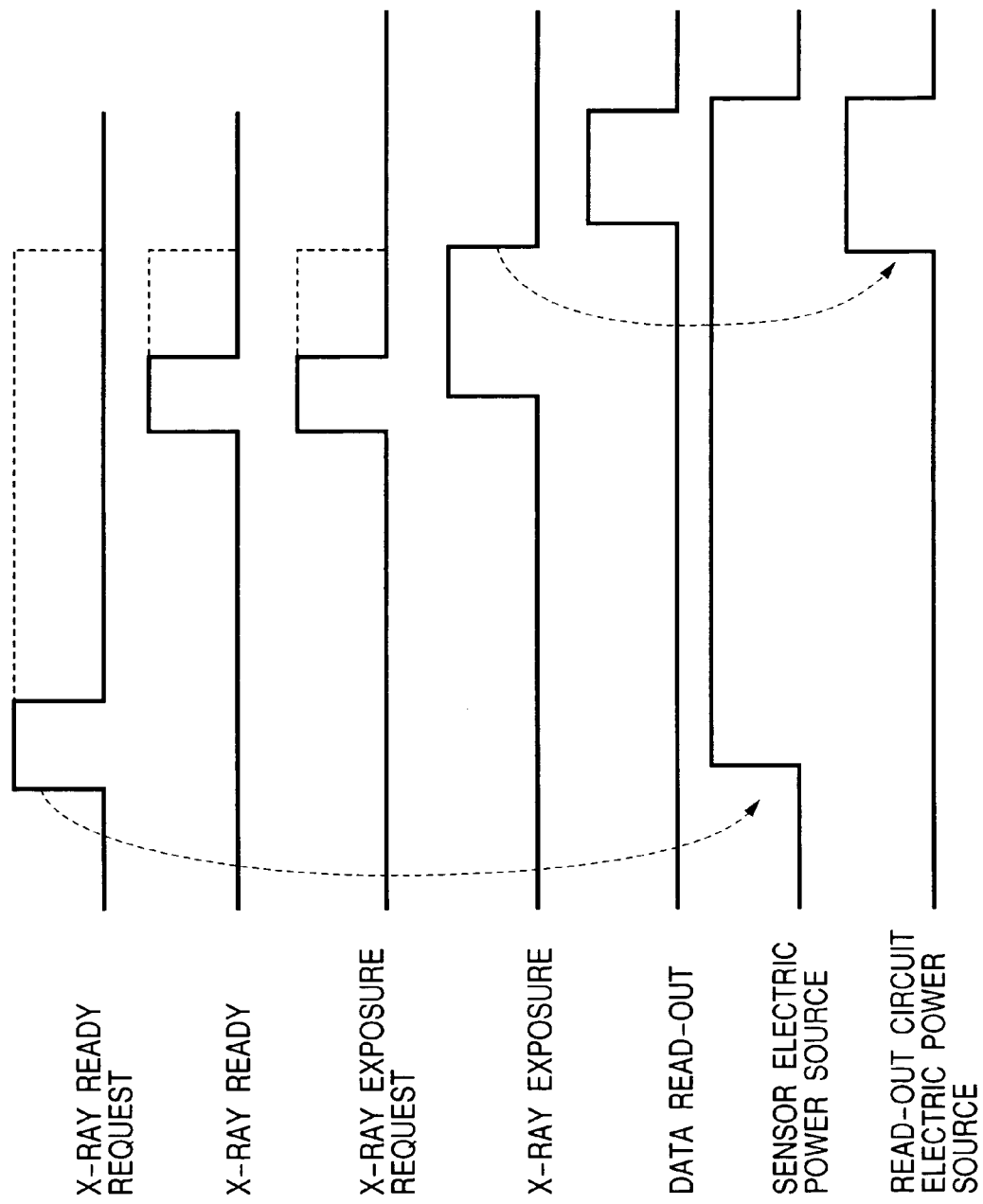
FIG. 6 is a diagram showing a second power on timing example.

The second example is an example in which the read-out circuit power source 503 is turned on based on the X-ray exposure completion signal and is shown in FIG. 6. The advantage of this example is the merit of capability of minimizing the ON time of the read-out circuit which causes large power dissipation. For transmission of an exposure completion signal, it is conceivable to directly connect the signal of the AEC 144 to the sensing control unit 214 as shown in FIG. 4, or to utilize a signal of a circuit (which is not shown in the drawings) monitoring the high voltage of the high voltage generation device 124. Use of the signal monitoring the high voltage enables X-rays corresponding to a delay of shut-off of X-rays to be accurately integrated as well. The completion of exposure may also be detected in such a manner that an X-ray monitor (which is not shown in the drawings) different from the AEC 144 is provided, for example, on the back side of the sensor 8, though not shown, to monitor the X-rays exposure, and completion of exposure is determined by use of a signal from the monitor.

Next presented is a third timing example showing a relation among the exposure timing of the X-ray generator and the supply timings of powers to the sensor 8 and to the read-out circuit 36.

The third timing example is presented in FIG. 7. The third timing example is different from the second example in that the exposure request signal is not outputted without output of exposure permission from the sensor. The first and second examples were arranged so that if the exposure request SW 602 was depressed and if the system was ready for X-ray exposure, then the exposure request signal was asserted to start the X-ray exposure, whereas the third example is arranged so that, in order to ensure a sufficient time after turning-on of the sensor power source 502 for the photodetection array 8, the sensing control unit 214 is provided with the exposure permission timer 603 (FIG. 4), a permission signal is not outputted unless a fixed time for stabilization of sensor offsets has elapsed since turning-on of the sensor power source 502, and after assertion of this permission signal, the exposure request signal is then asserted. The set time of the exposure permission timer 603 is determined in consideration of the characteristics of the sensor used and is set, for example, upon shipment from a factory, or upon installation at an installation site.

How each of the circuit components in the sensor 8 and in the read-out circuit 36 is turned on or off will be described below with reference to Table 1 and FIG. 3.

As summarized in the table below, all the circuits in the sensor 8 and in the read-out circuit 36 are in a state of Phase 1 in which no electric power is supplied thereto, before the sensing request. When the X-ray Ready-Request signal is outputted based on the sensing request from the radiation information system (RIS/HIS) or based on the sensing request from the operator, the circuits move into Phase 2 with detection of the signal. In Phase 2, the power is supplied to the bias power line Lb, the row select lines Lr, and the column select lines Lc of the sensor 8. Describing it referring to FIG. 3, the power is supplied to the circuits shown below the preamplifiers 26. When the X-ray exposure request signal is detected in the state of Phase 2 , when completion of actual exposure is detected, when turning of the high voltage generation device into Low is detected, or when a time-out of the integration control circuit occurs, the power is supplied to all the circuits shown in FIG. 3. Namely, the power is also additionally supplied to the preamplifiers 26, the sample hold circuits 28, the multiplexer 38, and the A/D converter 40. When in a state of Phase 3, all charges undergo A/D conversion and then completion of read-out is detected, the circuits transfer into Phase 4. In Phase 4, it is determined whether subsequent sensing is to be carried out. The circuits go into Phase 2 if yes, or into Phase 1 if no.

In the description provided above, it is described that the preamplifiers 26 and the sample hold circuit 28 are in an off-state in the Phase 2. However, it may also possible in the Phase 2 that they are in an on-state.

TABLE 1

Power Supply Transition Diagram

| | bias power line Lb | signal lines Lc, Lr | preamplifiers 26 and sample hold circuit 28 | multiplexer 38 and A/D converter 40 |
|---|---|---|---|---|
| Phase 1: idling state before sensing request | OFF | OFF | OFF | OFF |
| Phase 2: (e.g.) after sensing request | ON | ON | OFF | OFF |
| Phase 3: (e.g.) after completion | ON | ON | ON | ON |
| Phase 4: after completion of exposure | into Phase 1 or into Phase 2 | into Phase 1 or into Phase 2 | into Phase 1 or into Phase 2 | into Phase 1 or into Phase 2 |

As a modification of the third timing example, it is also possible to adaptively determine the time for stabilization of the sensor offsets, depending upon the actual data from the sensor, differently from the configuration in which the time for stabilization of the sensor offsets is determined by the set time determined in the exposure permission timer 603. In this case, it is, however, necessary to turn the read-out drive circuit power source 503 on and off every time data is read out.

As described above, the examples were configured to use the separate power sources for the sensor and for the driving and turn the respective power sources on and off, but it is also feasible to employ such configurations that, without turning the power sources themselves on and off in practice, the sensor and the read-out circuit are kept in a standby state (which was described above by the term "power OFF") with no voltage being applied to each of them.

Describing the standby state of the sensor specifically, it can be contemplated that all the drive lines Lc, Lr, Lb of the sensor 8 are set at an identical potential, e.g., at the GND potential so as to apply no voltage to the sensor 8. As for the standby of the read-out circuit 36, it can be contemplated that the standby is implemented by turning off power of each of the preamplifiers 26, the sample hold circuit 38, the multiplexer 39 and the A/D converter 40 in a state in which potentials of the peripheral line selector 32, the read-out circuit 36 and the power source 31 are set to a same potential.

It can also be contemplated that, without supplying the two power sources for the sensor and for the read-out circuit, there is provided only one common power source and then the power is supplied to the both or to either one of them by switching.

When the amount of heat generated by the drive read-out circuit is small, it can also be contemplated that the sensor power source 502 and the drive power source 503 are turned on on the basis of the X-ray ready request signal. In this case the technological advantages can be also achieved as compared with the prior art examples.

As described above, the power source system of the sensing part or the power supply system is separated into those for the sensor and for the read-out circuit and these are turned on or off in accordance with the X-ray exposure timing and the time for stabilization of the sensor, which can lengthen the lifetime of the sensor. The power consumption is reduced, so as to suppress generation of heat and thereby decrease the offsets of the sensor due to the heat, whereby the image sensing apparatus can be obtained with less noise in the image.

The present invention also embraces in its scope such configurations that program code of software for implementing the functions of the above embodiments is supplied and the system is operated according to the program stored in a computer (CPU or MPU) of the image sensing apparatus to carry out the functions.

In this case, the program code itself of the above software implements the foregoing functions of the embodiments and thus the program code itself and the means for supplying the program code to the computer, e.g., a recording medium storing the program code, constitute the present invention. The recording medium storing the program code can be selected, for example, from a floppy disk, a hard disk, an optical disk, a magnetooptical disk, a CD-ROM, a magnetic tape, a nonvolatile memory card, a ROM, and so on.

The above embodiments represent only some of embodied forms for carrying out the present invention, but it is to be understood that the technical scope of the present invention is by no means limited to these examples. Namely, the present invention can be carried out in various forms without departing from its technical concept or from the principal features thereof.

According to the embodiments of the invention, as described above, it becomes feasible to make the timing of supply of the power to the sensor 8 different from the supply timing of the power to the read-out circuit 36, which can lengthen the lifetime of the sensor. The power consumption is reduced, so as to suppress generation of heat, whereby the image can be obtained with less noise.

What is claimed is:

1. An image sensing apparatus comprising:
   a radiation generating apparatus adapted to generate radiation;
   a sensor comprising a plurality of image pick up elements for converting radiation to electrical signals;
   a signal line adapted to read out said electrical signals from said image pick up elements;
   a preamplifier adapted to amplify said electrical signals read out from said image pickup elements through said signal line;
   a first power source adapted to set said signal line to a reference potential so as to set said image pick up elements to an initialized state;
   a second power source adapted to supply electrical power to said preamplifier; and
   a control circuit adapted to transmit an exposure permission signal to the radiation generating apparatus after initializing the plurality of image pick up elements, and control the first power source and the second power source to drive the preamplifier after transmission of the exposure permission signal,
   wherein the control circuit stops the power supply from the second power source after reading out the electrical signals from the image pick up element.

2. An image sensing apparatus according to claim 1, wherein said control circuit controls said second power source so as to start supply of electrical power to said preamplifier on the basis of a timing of a reception of an exposure completion signal for said radiation generating apparatus.

3. An image sensing apparatus according to claim 2, wherein the exposure completion signal is generated by a radiation exposure dose monitor (AEC) in accordance with a reception of radiation or a monitor circuit for monitoring the electrical power of said radiation generating apparatus.

4. An image sensing apparatus according to claim 1, further comprising an exposure permission timer adapted to generate a radiation exposure permission signal for said radiation generating apparatus to generate radiation after a predetermined time elapses from setting of said signal line to the reference potential by said first power source, and
   wherein said control circuit controls said second power source so as to start a supply of electrical power to said preamplifier on the basis of a timing of generating a radiation exposure permission signal.

5. An image sensing apparatus according to claim 4, wherein said exposure permission timer generates the radiation exposure permission signal to said radiation generating apparatus to generate radiation on the basis of a time which is required to obtain a stable state of said sensor.

6. An image sensing apparatus according to claim 4, wherein said exposure permission timer generates the radiation exposure permission signal to said radiation generating apparatus to generate radiation on the basis of a time which is required to obtain a stable state of an offset of said sensor.

7. An image sensing apparatus according to claim 4, wherein said exposure permission timer checks in a real time manner an offset amount of said sensor, and generates the radiation exposure permission signal to said radiation generating apparatus on the basis of the checked offset amount.

8. An image sensing apparatus according to claim 1, wherein said control circuit is further adapted to read data from said sensor, and to control said second power source so as to stop a supply of electrical power to said preamplifier on the basis of a timing of the completion of the read-out operation.

9. An image sensing apparatus according to claim 1, wherein said control circuit controls said first power source so as to set said signal line to the reference potential on the basis of a timing for input of an exposure preparation signal.

10. An image sensing apparatus according to claim 9, wherein said control circuit controls said sensor so as to start an offset correction on the basis of the timing of outputting the exposure preparation signal, and controls said radiation generating apparatus so as to expose the radiation at a timing of completing the offset correction.

11. An image sensing apparatus according to claim 1, further comprising a start command transmitting device adapted to transmit an exposure preparation signal to said radiation generating apparatus and to said control circuit, in accordance with an operation of an operator.

12. An image sensing apparatus according to claim 1, further comprising a start command transmitting device adapted to transmit an exposure preparation signal to said radiation generating apparatus and to said control circuit, through a system storing information relating to radiation.

* * * * *

UNITED STATES PATENT AND TRADEMARK OFFICE
CERTIFICATE OF CORRECTION

PATENT NO. : 7,079,189 B2  Page 1 of 1
APPLICATION NO. : 09/923422
DATED : July 18, 2006
INVENTOR(S) : Osamu Tsujii et al.

It is certified that error appears in the above-identified patent and that said Letters Patent is hereby corrected as shown below:

COVER PAGE:
(56) References Cited, U.S. PATENT DOCUMENTS,
Insert -- 4,901,336 * 2/1990 Nishiki 250/370.09 --;
Insert -- 4,996,413 * 2/1991 McDaniel et al. 250/208.1 --;
Insert -- 5,109,155 * 4/1992 Mukainakano et al. 250/208.1 --;
Insert -- 2001/0028392 A1 * 2/2001 Yamamoto et al. 348/207 --; and
Insert -- 2002/0050568 A1 * 11/1998 Nonaka 250/370.09 --.

COLUMN 7:
Line 65, "lines Lr" should read -- lines Lc --.

COLUMN 8:
Line 3, "lines Lrn" should read -- lines Lc --; and
Line 28, "SIN ratio." should read -- S/N ratio. --.

COLUMN 10:
Line 31, "circuits 28," should read -- circuits 38, --;
Line 32, "38, and" should read -- 39, and --;
Line 39, "circuit 28" should read -- circuit 38 --;
Line 48, TABLE 1, "38 and" should read -- 39 and --; and
Line 49, TABLE 1, "circuit 28" should read -- circuit 38 --.

Signed and Sealed this

Twelfth Day of January, 2010

David J. Kappos
*Director of the United States Patent and Trademark Office*